United States Patent [19]
Kim

[11] Patent Number: 5,589,997
[45] Date of Patent: Dec. 31, 1996

[54] TRACKING CONTROL METHOD AND APPARATUS FOR VIDEO RECORDER WHICH ADDS A COMBINED FIRST AND SECOND TRACKING ERROR SIGNAL TO THE NEXT TRACKING ERROR SIGNAL

[75] Inventor: Jeong-tae Kim, Seoul, Rep. of Korea

[73] Assignee: Samsung Electronics Co., Ltd., Kyungki-do, Rep. of Korea

[21] Appl. No.: 260,825

[22] Filed: Jun. 16, 1994

[30] Foreign Application Priority Data

Jun. 16, 1993 [KR] Rep. of Korea .................. 1993-10977

[51] Int. Cl.[6] .......................... G11B 5/588; G11B 15/467
[52] U.S. Cl. ...................... 360/77.14; 360/77.13
[58] Field of Search ............................ 360/77.14, 77.15, 360/73.04, 73.05, 73.08, 77.13

[56] References Cited

U.S. PATENT DOCUMENTS 4,581,659  4/1986  Azuma et al. ........................ 360/10.2
4,977,469  12/1990  Yokozawa ............................. 360/77.15
5,119,249  6/1992  Uchikoshi ............................. 360/77.15
5,182,683  1/1993  Mitsuhashi et al. ................. 360/77.16
5,280,399  1/1994  Owada ................................. 360/77.15

OTHER PUBLICATIONS

Kim, (Applicant), FIG. 1,.

Primary Examiner—Andrew L. Sniezek
Assistant Examiner—Larry T. Cullen
Attorney, Agent, or Firm—Sughrue, Mion, Zinn, Macpeak & Seas

[57] ABSTRACT

A tracking control apparatus includes a memory for storing tracking control information of a previous track corresponding to a present position of a current track being tracking-controlled, and a tracking controller for generating a new tracking control signal by using a tracking error signal derived from the current track and stored tracking control information for the previous track, to thereby enhance the precision of tracking control of the present track even when the track is deformed. A corresponding method is also described.

9 Claims, 5 Drawing Sheets

TRACK
TRACK I+1
TRACK I+2
TRACK I+3

→ TRAVELLING DIRECTION

TE

I   I+1   I+2   I+3   TRACK

TRACKING CONTROL METHOD AND APPARATUS FOR VIDEO RECORDER WHICH ADDS A COMBINED FIRST AND SECOND TRACKING ERROR SIGNAL TO THE NEXT TRACKING ERROR SIGNAL

BACKGROUND OF THE INVENTION

1. Field of the Invention

The present invention relates to a tracking control apparatus for a video tape recorder, and more particularly, to a tracking control apparatus for a video tape recorder in which a head is controlled to precisely travel on predetermined tracks by using both the rotation number of a capstan motor and tracking errors detected by the head. A tracking control method is also disclosed.

2. Description of Related Art

In video tape recorders (VTRs), the purpose of tracking control is to obtain the maximum possible envelope output by controlling a video head to precisely travel on a prescribed track. During tracking control, if the head precedes a predetermined track, the speed of a capstan motor is controlled to become slower and therefore the travelling speed of tape becomes slower. If the head falls behind the predetermined track, the speed of the capstan motor is increased, thereby making tape travel faster.

A tracking error must be detected for such tracking control. A VHS-VTR records a control signal on a linear track. On the other hand, an 8 mm-VTR records a pilot signal on the data track so as to permit automatic track following (hereinafter referred to as ATF). In the 8 mm-VTR using the pilot signal, tracks on which video signals are recorded are divided using a prescribed number of pilot signals having different frequencies from one another. During playback, the tracking error is calculated using the detected pilot signals. A conventional apparatus for controlling the head to precisely travel on tracks by reducing tracking errors will now be discussed with reference to FIG. 1 through FIG. 3B.

FIG. 1 is a block diagram of a conventional tracking control apparatus. In FIG. 1, a tracking controller 21, receiving a tracking error signal TE from a tracking error signal generator (not shown), generates a first control signal C1 for controlling the speed of the capstan relevant to the speed of a head drum (not shown). A capstan motor 24 rotates the capstan for use in transporting tape. A capstan motor driver 23 generates a capstan motor driving signal. A capstan speed controller 22 receives a frequency signal (hereinafter referred to as FG signal) corresponding to the rotation number of capstan motor 24 and outputs a second control signal C2 for rotating the capstan at a predetermined speed by using the FG signal. An adder 25 adds the output signal C1 of tracking controller 21 and output signal C2 of capstan speed controller 22 and outputs the added result to capstan motor driver 23.

FIG. 2A illustrates diagonally disposed ideal tracks and head travel track H. FIG. 2B illustrates tracking error signal TE detected by head travel in the playback mode.

FIG. 3A illustrates tracks of the head linearly travelling on crooked tracks. FIG. 3B shows tracking errors detected from the similarly crooked tracks by the linearly travelling head. Normal tracks are in the form that is shown in FIG. 2A, that is, parallel to each other and diagonal to the tape. However, if the tracks are crooked as shown in FIG. 3A due to poor linearity, it is the crooked tracks which store information. When the information stored on those tracks is read, tracking errors are repeatedly generated having similar magnitudes, as depicted in FIG. 3B. Tracking control for the case in which the apparatus of FIG. 1 reads a signal from a video tape having such nonlinear tracks will be explained in greater detail immediately below.

Tracking controller 21 receives tracking error signal TE obtained from the pilot signal and generates first control signal C1. Capstan speed controller 22 calculates the rotation speed of capstan motor 24 by using the FG signal supplied from the capstan motor 24 and compares the calculated rotation speed and a predetermined rotation speed of capstan motor 24, thereby generating second control signal C2. Adder 25 adds above-mentioned control signals C1 and C2 and outputs a third control signal C3. Capstan motor 24 is driven by third control signal C3 applied to capstan motor driver 23. Tracking error signal TE and rotation number signal FG from capstan motor 24 continue to be used during tracking control. However, there is a slight time difference between the generation of a speed control signal C3 for head tracking with respect to tracking error signal TE and the FG signal of capstan 24, and the driving of the capstan motor 24 according to a generated speed control signal. Thus, the position on an actually controlled track falls behind a position corresponding to which a tracking error is detected. This prevents a precise tracking control, especially when tracks are severely deformed. It will be noted that the tracking control is more difficult to perform, resulting in poor displayed picture quality. Such a problem becomes more serious when a narrower track is used for high-density recording.

A technique for precise tracking control on crooked tracks is disclosed in U.S. Pat. No. 5,182,683, published on Jan. 26, 1993, by Mitsuhashi et al. In this patent, a signal read out from a track via a magnetic head is envelope-detected and converted into a digital envelope signal. A capstan is then controlled so that the intensity of the digital envelope signal reaches a substantially maximum value. Simultaneously, a prestored ideal scanning pattern of the magnetic head is compared with the digital envelope signal. On the basis of the compared result, the ideal scanning pattern is corrected, and the position of the magnetic head is changed in substantially perpendicular direction to the rotation axis of the rotating drum so that the intensity of the envelope signal becomes the substantial maximum value.

Another reference for controlling tap travelling is U.S. Pat. No. 4,581,659, published on Apr. 8, 1986, by Azuma et al. This disclosure teaches that a set value for control of a capstan motor is re-adjusted by using the differene between a present-track tracking error signal and a previous-track tracking error signal.

SUMMARY OF THE INVENTION

The principal object of the present invention is to provide a tracking control method in which tracking control information of a previous track with respect to a plurality of tracking control positions set on respective tracks is stored in a memory and the tracking control with respect to the present track is performed by using the tracking control information for the previous track corresponding to respective currently tracking-controlled tracking control positions thereby enabling precise tracking control even when a track has poor linearity and/or the width thereof becomes narrower.

Another object of the present invention is to provide a tracking control apparatus in which tracking control information of a previous track with respect to a plurality of tracking control positions set on a track having poor linearity is stored in a memory and the tracking control of a present track is performed by using the tracking control information of the previous track corresponding to respective currently tracking-controlled tracking control positions.

These and other objects, features and advantages according to the present invention are provided by a method for tracking control so as to read out information divided by pilot signals and recorded on magnetic tape driving a capstan. The tracking control method comprises steps for: (a) comparing a current rotation number of the capstan and a predetermined rotation number thereof and generating a first capstan speed control signal; (b) storing second capstan speed control signals of a previous track respectively corresponding to a plurality of control positions on a track; (c) generating a tracking error signal from the pilot signals; (d) receiving the tracking error signal and a second tracking speed control signal corresponding to the tracking error signal among the stored second tracking speed control signals, thereby renewing the second tracking speed control signal; and (e) adding the first capstan speed control signal and the renewed second tracking speed control signal.

These and other objects, features and advantages of the present invention are provided by an apparatus for tracking control so as to permit read out of information recorded on a track of magnetic tape driven by a capstan. The tracking control apparatus comprises: a capstan speed controller for receiving a rotation number signal of the capstan and comparing the input rotation number of the capstan and a predetermined rotation number thereof, thereby outputting a first capstan speed control signal; tracking error generation means for receiving a pilot signal and generating a tracking error signal; a memory for storing second capstan speed control signals generated respectively corresponding to a plurality of control positions on a track; tracking control means for receiving the tracking error signal from the track error generation means and the second tracking speed control signal corresponding to the tracking error signal among the second tracking speed control signals stored in the memory, thereby renewing and outputting the second tracking speed control signal; an adder for adding the renewed second capstan speed control signal and the first capstan speed control signal applied from the capstan speed controller; and means for rotatingly driving the capstan after receiving the output of the adder.

BRIEF DESCRIPTION OF THE DRAWINGS

The preferred embodiments are described with reference to the drawings wherein.

DETAILED DESCRIPTION OF THE PREFERRED EMBODIMENTS

Hereinafter, preferred embodiments of a tracking control method and corresponding apparatus according to the present invention will be described in detail with reference to the attached drawings of FIGS. 4, 5 and 6.

Figure 4:
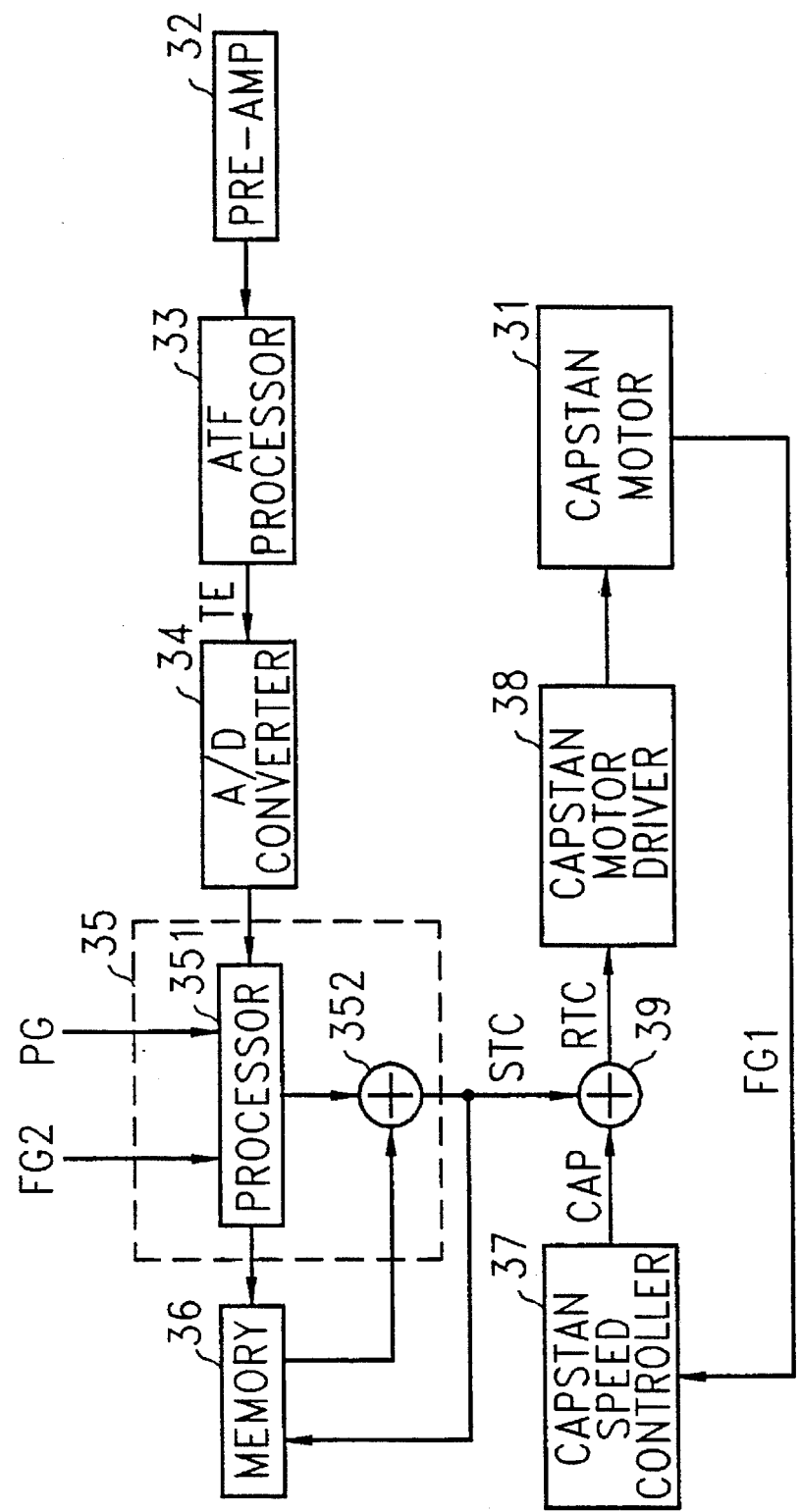
FIG. 4 is a block diagram of a tracking control apparatus in accordance with a preferred embodiment of the present invention.

Referring to FIG. 4, the apparatus comprises a pre-amp 32 connected to a video head, an ATF processor 33 for generating a tracking error signal TE after receiving a video signal output from pre-amp 32, and an A/D converter 34 for converting the output signal of ATF processor 33 into a digital signal and outputting the digital-converted signal to tracking controller 35. The apparatus of FIG. 4 further includes tracking controller 35 for generating a second capstan speed control signal STC corresponding to one of a plurality of predetermined tracking control positions, a memory 36 for storing the second capstan speed control signal STC generated from tracking controller 35, and a capstan speed controller 37 for generating a first capstan speed control signal CAP in response to receiving a rotation number signal FG1 of a capstan motor 31. A first adder 39 adds first capstan speed control signal CAP and second capstan control signal STC and outputs the added result to capstan motor driver 38.

Tracking controller 35 is made up of a processor 351 for generating a third capstan speed control signal in accordance with the difference of the crooked degrees of a previous track and a present track on the basis of input tracking error signal TE, and a second adder 352 for adding the third capstan speed control signal and a tracking control signal corresponding thereto. After receiving rotation number data FG2 and track start point signal PG from a head drum motor (not shown), processor 351 controls memory 36 so as to read out the second capstan speed control signal STC stored in memory 36 or to store second capstan speed control STC output from second adder 352.

A tracking control operation of the apparatus of FIG. 4 when a video signal is reproduced from video tape having crooked tracks will be explained in greater detail below.

A recorded video signal is read out via a video head by capstan motor 31 and an unshown head drum. When the read video signal is input to pre-amp 32, pre-amp 32 amplifies and outputs the input signal. ATF processor 33 detects a pilot signal from the amplified input video signal and generates tracking error signal TE using the detected pilot signal. Tracking error signal TE is converted into a digital signal by A/D converter 34 and is then fed to tracking controller 35.

Processor 351 in tracking controller generates the third capstan speed control signal with respect to a present tracking control position on the basis of input tracking error signal TE. Here, processor 351 determines a control position of the present track by using rotation number data FG2 and track start point signal PG associated with the head drum motor. Processor 351 also reads out the second capstan speed control signal STC of the previous track corresponding to the present control position. Preferably, memory 36 previously stored the second capstan speed control signals of the previous track in accordance with the respective tracking control positions.

Second adder 352 adds the second capstan speed control signal and the third capstan speed control signal of the previous track. Second capstan speed control signal STC of the present track generated by adder 352 is restored in memory 36 and simultaneously output to first adder 39.

Figure 1:
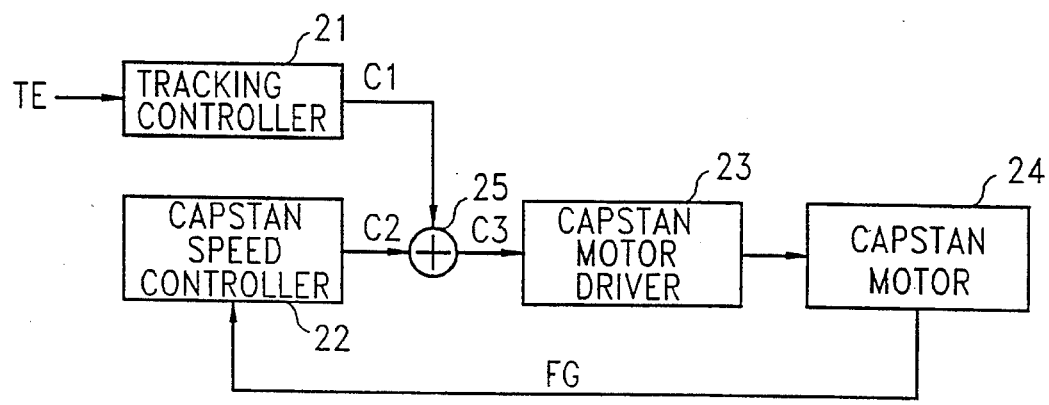
FIG. 1 is a block diagram of a conventional tracking control apparatus.
Figure 2A:
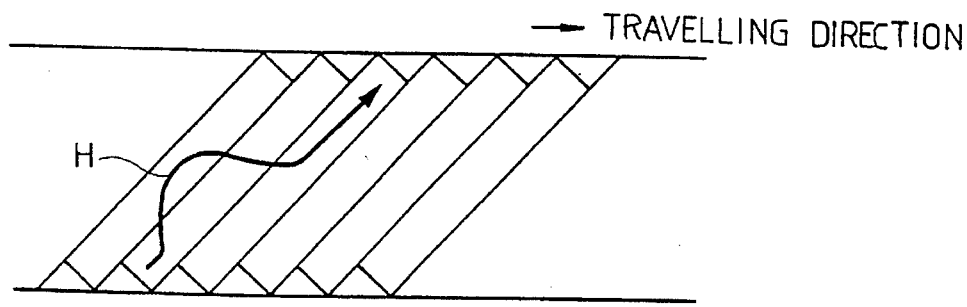
FIGS. 2A and 2B are conceptual diagrams of travel tracks of a head and its tracking errors.
Figure 2B:
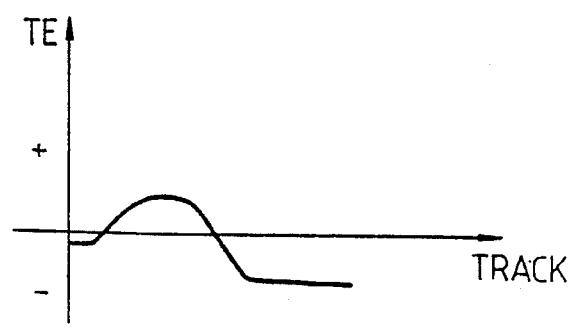
Figure 3A:
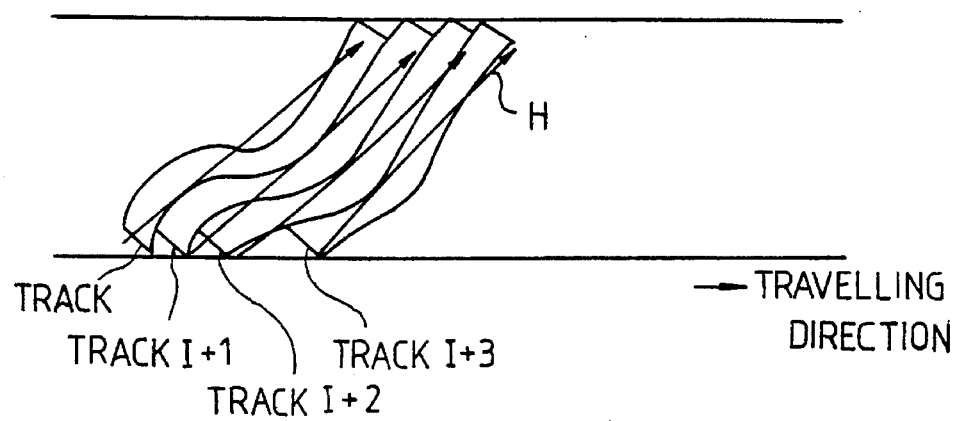
FIGS. 3A and 3B illustrate tracks of poor linearity and tracking errors detected from those tracks.
Figure 3B:
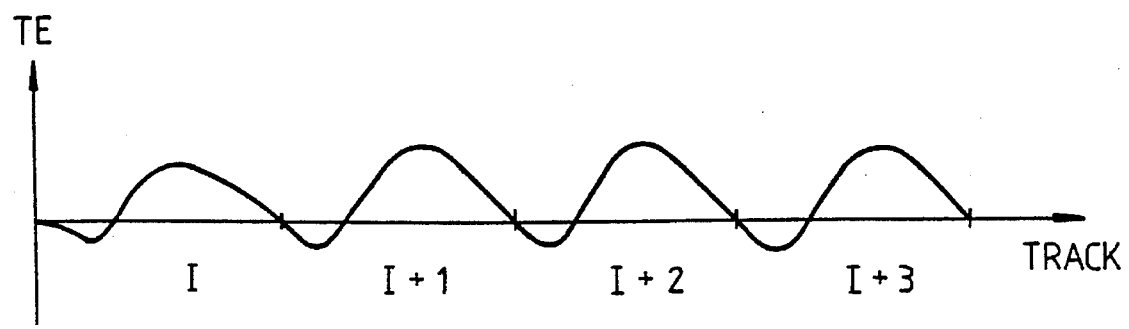

Capstan speed controller 37 generates first capstan speed control signal CAP by using a predetermined capstan speed and rotation number signal FG1, similar to capstan speed controller 22 of FIG. 1. First adder 39 generates a real capstan speed control signal RTC by adding first capstan speed control signal CAP and second capstan speed control signal STC for the present track and outputs the signal RTC to capstan motor driver 38. The real capstan control signal RTC is generated with respect to every control position being tracking-controlled, as mentioned earlier. The second capstan speed control signal STC of the present track stored in memory 36 are used for tracking control of a next track.

Figure 5:
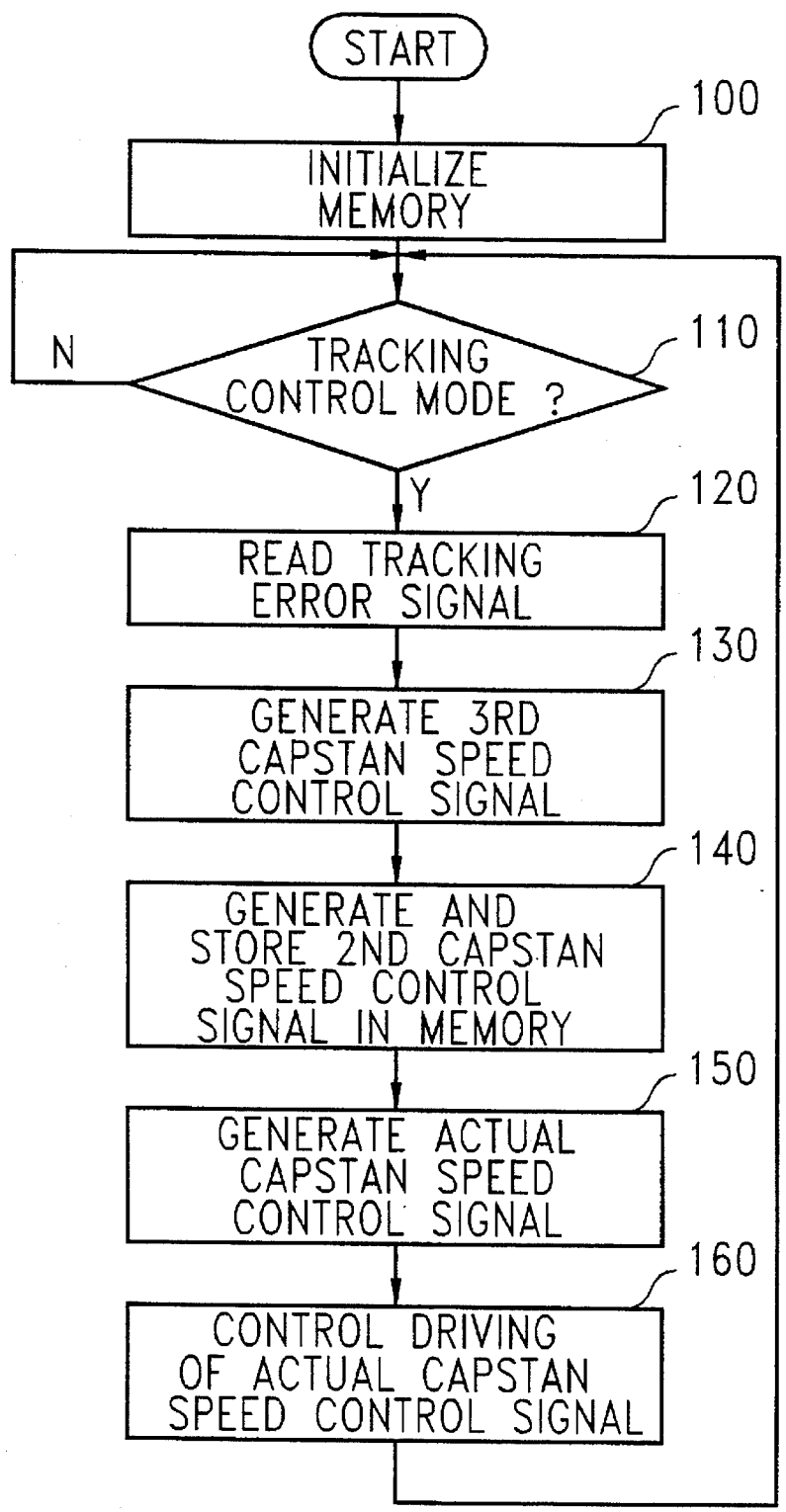
FIG. 5 is a flow chart for explaining a tracking control method of the present invention.
Figure 6:
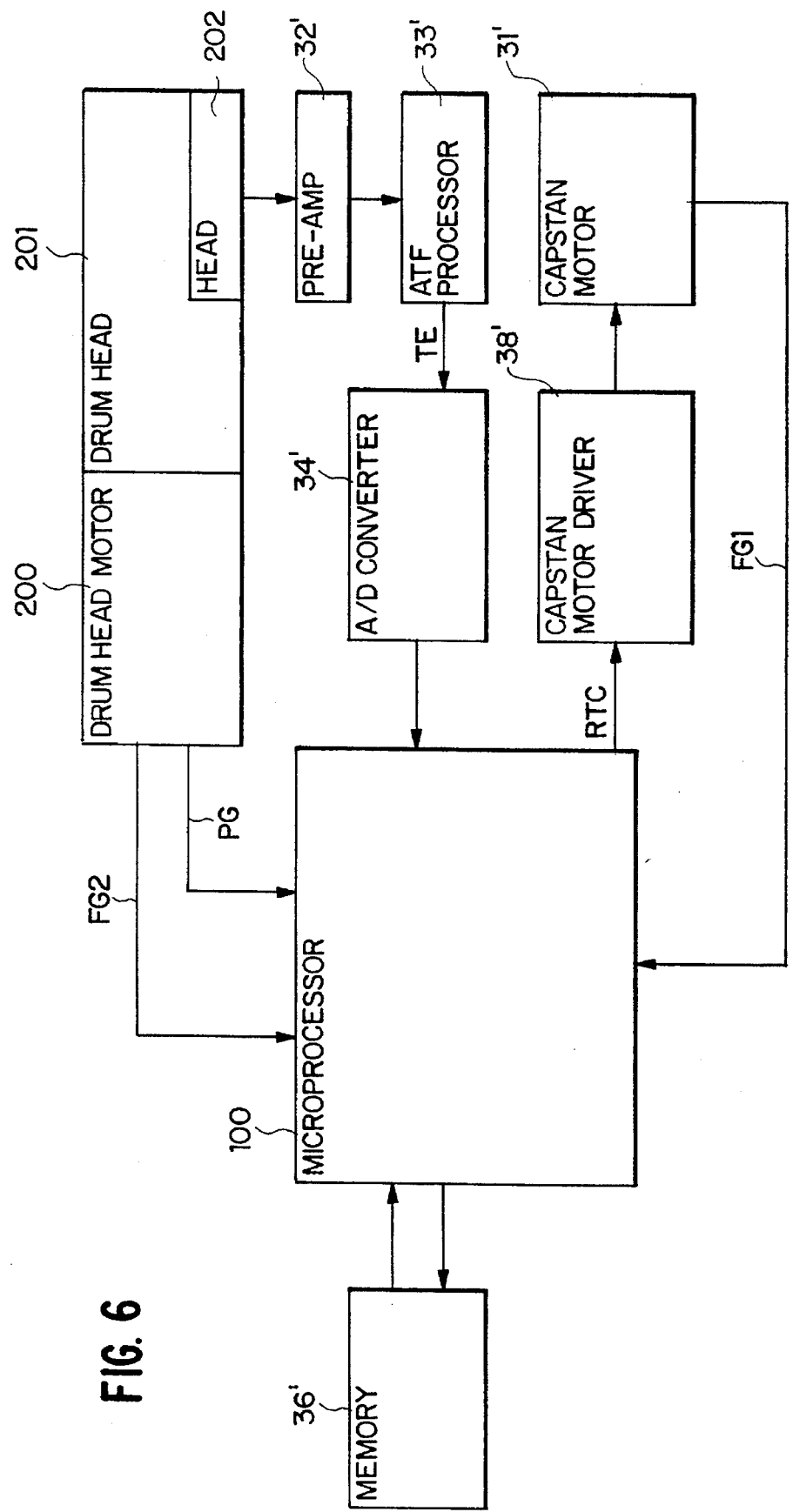
FIG. 6 is a high level block diagram of an alternative embodiment of the present invention according to FIG. 4.

FIG. 5 is a flow chart for the tracking control method according to the present invention. The method of FIG. 5 is accomplished by a microprocessor 100 connected to receive the output signal of A/D converter 34 and rotation number signal FG1 of capstan motor 31 of FIG. 4. The microprocessor 100 has the same function as that of the system consisting of tracking controller 35, capstan speed controller 37 and first adder 39 in the tracking control apparatus of FIG. 4, as shown in FIG. 6. The blocks indicated as 31', 32', 33', 34', 36' and 38' in FIG. 6 have the same functions as elements 31, 32, 33, 34, 36 and 38, respectively, as described above with respect to FIG. 4.

When a VTR starts to operate in the playback mode, the microprocessor 100 initializes memory 36' in step 100 so as to store second capstan speed control signals STC for the previous track corresponding to respective control positions of the present track being tracking-controlled. It is determined whether the present mode is a tracking control mode or not during step 110. If the present mode is the tracking control mode, the microprocessor 100 reads tracking error signal TE separated by ATF processor 33' in step 120. Then, the microprocessor 100 determines respective control positions being tracking-controlled on the basis of rotation number signal FG2 and track start point signal PG of the head drum motor 200 and generates the third capstan speed control signal with respect to the present control position using input tracking error signal TE during step 130. The microprocessor 100 controls memory 36' so that the second capstan speed control signal of the previous track corresponding to the present track position being controlled is output from memory 36'. Then, the second capstan speed control signal of the present track is generated by the addition of the above-discussed second capstan speed control signal and third capstan speed control signal of the previous track. Preferably, the microprocessor 100 controls memory 36' during step 140 so that second speed control signal STC for the respective position is stored in memory 36'. The microprocessor 100 adds the second capstan speed control signal of the present track and the first capstan speed control signal determined by the rotation number of the capstan motor 31', thereby generating the real capstan speed control signal RTC during step 150. Capstan motor driver 38' drive capstan motor 31' under control of the real capstan speed control signal RTC applied from the microprocessor 100 during step 160.

When tracking control for a predetermined position is finished, tracking control for a next tracking control position is performed by repetitively performing steps 110–160. Accordingly, by using tracking control information for the previous track, the present invention enhances the precision of tracking control with respect to the present track even when the track is deformed.

While certain embodiments of the invention have been specifically described, it will be that numerous modifications may be made thereto without departing from the spirit and scope of the invention.

What is claimed is:

1. A tracking control apparatus for read out of information recording on a track of a magnetic tape driven by a capstan motor, said tracking control apparatus comprising:

a capstan speed controller receiving a rotation number signal of said capstan and comparing the input rotation number signal and a predetermined rotation number thereof, thereby outputting a first capstan speed control signal;

tracking error generating means receiving a pilot signal for generating a tracking error signal;

a memory for storing a renewed second capstan speed control signal as one of second capstan speed control signals generated respectively at corresponding control positions of a track;

tracking control means receiving said tracking error signal and a respective one of said second capstan speed control signals, stored in said memory and corresponding to said tracking error signal, for renewing and outputting said second capstan speed control signal as the respective renewed second capstan speed control signal;

first adding means for adding said respective renewed second capstan speed control signal and said first capstan speed control signal applied from said capstan speed controller to thereby generate a real capstan speed control signal; and means for rotatingly driving said capstan in response to the real capstan speed control signal output by said first adding means.

2. The tracking control apparatus as claimed in claim 1, wherein said memory stores second capstan speed control signals with respect to said control positions of a previous track.

3. The tracking control apparatus as claimed in claim 2, wherein said tracking control means comprises:

an A/D converter receiving said tracking error signal from said tracking error generating means and converting said tracking error signal into a digital tracking error signal;

a processor receiving said digital tracking error signal from said A/D converter, for generating a third capstan speed control signal corresponding to a present control position in accordance with deviation of said previous track from a present track, and for controlling said memory so that said second capstan speed control signal corresponding to the present control position is output from said memory; and second adding means for adding the second capstan speed control signal corresponding to the previous track output from said memory and the third capstan speed control signal output from said processor to thereby generate said respective second capstan speed control signal.

4. The tracking control apparatus as claimed in claim 3, wherein said processor controls said memory so that the output of said respective second capstan speed control signal of said second adding means is stored corresponding to a relevant control position.

5. A tracking control method for tracking control responsive read out information associated with pilot signals recorded on magnetic tape driven by a capstan motor, a tracking control method comprising the steps of:

(a) comparing a current rotation number of said capstan motor and a predetermined rotation number thereof and generating a first capstan speed control signal;

(b) storing a renewed second capstan speed control signal as one of second capstan speed control signals associated with a previous track respectively corresponding to a plurality of control positions on a present track;

(c) generating a tracking error signal from said pilot signals;

(d) generating a second tracking speed control signal corresponding to said tracking error signal and a respective one of said stored second capstan speed control signals, and renewing said second capstan speed control signal to thereby provide the respective renewed second capstan speed control signal; and (e) adding said first capstan speed control signal and said respective renewed second capstan speed control signal to produce a real capstan speed control signal.

6. The tracking control method as claimed in claim 5, wherein said step (b) comprises storing each of said second capstan speed control signals with respect to control positions of the previous track.

7. The tracking control method as claimed in claim 6, wherein said step (d) comprises the steps of:

(f) converting said tracking error signal into a digital tracking error signal;

(g) generating responsive to said digital tracking error signal a third capstan speed control signal corresponding to a present control position in accordance with deviation between the previous track and the present track;

(h) reading a respective one of said second capstan speed control signals for the previous track corresponding to a present control position from among said stored second capstan speed control signals; and (i) adding the read said second capstan speed control signal to said third capstan speed control signal.

8. A tracking control apparatus for track read out in a video tape recorder having a volatile memory and a microprocessor operatively coupled for reading from and storing to the memory, wherein the microprocessor receives a first signal indicative of head drum motor position, a second signal indicative of a current track starting point associated with track readout, and a tracking error signal, and wherein the microprocessor is one element of a control loop formed by the microprocessor, and capstan motor driver receiving a real capstan speed control signal from the microprocessor, and a capstan motor driven by the capstan motor driver and generating a third signal indicative of capstan motor position applied to the microprocessor for determining a first capstan speed control signal, said tracking control method comprising:

(a) determining a present control position in response to said first and said second signals;

(b) reading out a second capstan speed control signal associated with a previous track and corresponding to said present control position from the memory;

(c) generating a third capstan speed control signal responsive to the tracking error signal;

(d) combining said second and said third capstan speed control signals to thereby produce a renewed capstan speed control signal;

(e) combining said renewed capstan speed control signal and the first capstan speed control signal to thereby generate said real capstan speed control signal; and (f) storing said renewed capstan speed control signal at a location in the memory corresponding to said current position so as to be available for read out as said third capstan speed control signal during read out of a next adjacent track;

wherein said step (f) is performed after each performance of said step (d).

9. The tracking control method as recited in claim 8, wherein said step (c) comprises the step of generating said third capstan speed control signal responsive to the tracking error signal and said current control position determined during performance of said step (a).

* * * * *